US006060941A

United States Patent [19]

Brownlow et al.

[11] Patent Number: 6,060,941
[45] Date of Patent: May 9, 2000

[54] FAULT TOLERANT CIRCUIT ARRANGEMENT AND ACTIVE MATRIX DEVICE INCORPORATING THE SAME

[75] Inventors: Michael James Brownlow, Sandford on Thames; Andrew Kay, Oxford; Graham Andrew Cairns, Cuttleslow, all of United Kingdom

[73] Assignee: Sharp Kabushiki Kaisha, Osaka, Japan

[21] Appl. No.: 09/037,909

[22] Filed: Mar. 10, 1998

[30] Foreign Application Priority Data

Mar. 15, 1997 [GB] United Kingdom .................. 9705417

[51] Int. Cl.[7] .................................................. G06F 11/16
[52] U.S. Cl. ......................................... 327/526; 327/425
[58] Field of Search ................................. 327/403, 404, 327/526, 425; 365/200; 371/10.2; 455/61

[56] References Cited

U.S. PATENT DOCUMENTS

| | | | |
|---|---|---|---|
| 4,897,563 | 1/1990 | Bahl | 327/526 |
| 5,111,060 | 5/1992 | Asada | 307/219 |
| 5,173,792 | 12/1992 | Matsueda | 359/59 |
| 5,418,406 | 5/1995 | Hirano et al. | 327/526 |
| 5,465,053 | 11/1995 | Edwards | 324/770 |

FOREIGN PATENT DOCUMENTS

| | | |
|---|---|---|
| 2206721 | 1/1989 | United Kingdom . |
| 2215506 | 9/1989 | United Kingdom . |

OTHER PUBLICATIONS

Y. Takafuji et al., SID 93 Digest, pp. 383–386, 1993, “A 1.9–IN. 1.5–M Pixel Driver Fully–Integrated Poly–Si TFT–LCD for HDTV Projection”.

C. Bolchini et al., 1994 IEEE International Symposium on Circuits and Systems, pp. 83–86, 1994, “CMOS Reliability Improvements Through a New Fault Tolerant Technique”.

A. A. Sorensen, Electro–Tchnology, pp. 118–125, 1961, “Digital–Circuit Reliability Through Redundancy”.

R. E. Kuehn, IEEE Transactions on Reliability, vol. 18, No. 1, pp. 3–11, 1969, “Computer Redundancy: Design, Performance, and Future”.

*Primary Examiner*—Jung Ho Kim
*Attorney, Agent, or Firm*—Renner, Otto, Boisselle & Sklar

[57] ABSTRACT

A fault tolerant circuit arrangement includes: an input; an output; a first circuit element, a second circuit element, a third circuit element, and a fourth circuit element, provided in such a manner that the first and second circuit elements are connected in series between the input and the output to form a first series combination, and the third and fourth circuit elements are connected in series between the input and the output to form a second series combination, the first series combination being connected in parallel with the second series combination between the input and the output; and, a control element connected between an interconnection point of the first and second circuit elements and an interconnection point of the third and fourth circuit elements. The control element is switchable by a control signal between a conducting mode in which current flow is enabled between the interconnection points and a non-conducting mode in which current flow is prevented between the interconnection points.

14 Claims, 4 Drawing Sheets

FAULT TOLERANT CIRCUIT ARRANGEMENT AND ACTIVE MATRIX DEVICE INCORPORATING THE SAME

BACKGROUND OF THE INVENTION

1. Field of the Invention

This invention relates to fault tolerant circuit arrangements, and is concerned more particularly, but not exclusively, with fault tolerant thin film transistor (TFT) circuits which may be used, for example, in drive and control circuits for active matrix liquid crystal displays (AMLCDs).

2. Description of the Related Art

A typical active matrix display device incorporates drive and control circuits at the periphery of the display area, which process the incoming information and provide it to the active display matrix. Typically, the display matrix is similar to a DRAM structure having column lines which carry data in the form of voltages and row lines to which timing signals are applied to control switching of pixel switching elements located at the intersections of the column lines and the row lines. The function of the pixel switching elements is to pass data voltages to a pixel capacitor in order to modulate some property of the display material.

The most common form of active matrix display is the AMLCD. In this form of display, the voltage stored at the pixel is used to modulate the optical properties of a thin layer of liquid crystal material.

Conventionally, the pixel switching elements in such a display are amorphous silicon thin film transistors (aSi-TFT), and the peripheral drive and control circuits are custom integrated circuits fabricated from single crystal silicon, bonded around the edge of the display and connected to the data and scan lines of the active matrix (which correspond to the above-mentioned column lines and row lines, respectively). In recent years, however, there has been a growing interest in the use of polysilicon thin film transistors fabricated at temperatures which are low enough to enable them to be integrated with the glass substrates used for the display. Polysilicon thin film transistors have sufficient performance to enable the peripheral drive and control circuits to be fabricated on the substrates with consequent benefits in terms of manufacturing cost and pixel pitch.

However, such integration of the drive and control circuits can result in a decrease in the manufacturing yield caused by faults within the integrated drive and control circuits. Furthermore, such circuits are prone to failure as a result of their large area and inherent variation in the properties of the thin film transistors, and a fault in one of the transistors could cause catastrophic failure of the whole panel. Variations in parameters, such as the threshold voltage and mobility of the transistors, often manifest themselves as a soft failure caused by the inability of a particular transistor to match the performance of neighboring transistors in the same circuit.

For these reasons, fault tolerant circuit design is becoming increasingly important, both in AMLCD applications in order to increase the yield of the displays with integrated drive circuitry, and also in other large area applications of thin film electronics.

A number of fault tolerant design techniques are already known.

A redundancy-with-repair (RWR) technique involves duplicating the basic functional circuit and employing some means to effect a repair if one of the functional circuits is found to be faulty after manufacture. For example, U.S. Pat. No. 5,111,060, and Y.Takafuji et al., SID'93 Digest, pages 383–386 disclose the application of an RWR technique to AMLCDs.

Furthermore, FIG. 1 of the accompanying drawings shows a RWR circuit arrangement for the peripheral circuit of an AMLCD in which a number of basic functional circuits are duplicated to form shift register element pairs 1, 1*a*; 2, 2*a*; 3, 3*a*, etc. Specifically, in the RWR circuit arrangement of FIG. 1, the spare shift register elements 1, 2, 3, etc. are connected between the associated circuit input and output by means of welding pads 4 and 5 in parallel with the shift register elements 1*a*, 2*a*, 3*a*, etc. connected between the associated circuit input and output by means of cutting pads 6 and 7. Thus, there is provision for completely removing a defective shift register element, such as the element 1*a*, from the circuit by irradiating the cutting pads 6 and 7 with a laser, and welding in the replacement shift register element, such as the element 1, by means of the welding pads 4 and 5.

While the RWR technique can offer significant fault tolerance with reasonable overhead and negligible detrimental effect on circuit performance, there are many applications in which the low level test and repair steps of such a technique are too expensive to incorporate in the fabrication process. Furthermore, it is preferred that fault tolerance should be provided without the need for repair of the circuit.

A triple-modular-redundance (TMR) technique involves, as shown diagrammatically in FIG. 2 of the accompanying drawings, replicating the basic functional circuit in triplicate and connecting the outputs of the circuits 10, 11 and 12 to a common voting circuit 13 for producing an output corresponding to the majority vote of the outputs of the circuits 10, 11 and 12. Such a technique is known, for example, from C.Bolchini et al., IEEE International Symposium on Circuits and Systems 1994, pages 83–86; and A. A.Sorenson: "Digital circuit reliability through redundancy", Electro-Technology, Vol.67, No.7, pages 118–125 (July-1961).

It will be appreciated that such a technique can be implemented by connecting the circuits 10, 11 and 12 to three AND gates driving a common OR gate. Such an arrangement is tolerant to a fault in any one of the three circuits 10, 11 and 12.

However, there is only a certain probability that such an arrangement will tolerate additional faults. Furthermore, the technique is rendered costly by the provision of circuits in triplicate and by the associated decision logic. Furthermore, the performance will be considerably inferior to a correctly functioning non-redundant circuit in terms of power consumption and speed, as a result of the additional load presented by the three parallel circuits and also the delay through the decision logic. For these reasons, the TMR technique is not practicable for the decision circuits of AMLCDs which are essentially simple replicated circuits required to operate at high speed.

Another technique which has not received as much attention in the literature is a Quad-Masking (QM) technique, as referred to in R. Kuehn: "Computer redundancy: design, performance and future", IEEE Transactions on Reliability, Vol.R-18, No.1, pages 3–11.

As shown diagrammatically in FIG. 3 of the accompanying drawings, the QM technique involves connecting together four basic functional circuits 15, 16, 17 and 18 such that the circuits 15 and 16 are in series and the circuits 17 and 18 are in series. The circuit pairs 15, 16 and 17, 18 are connected in two parallel paths between a common input and output. Such a technique is considerably more robust than the TMR technique, and at least two of the circuits must fail to cause failure of the arrangement.

The connection 19 shown by a broken line in FIG. 3 can be made according to the relative probabilities of occurrence of stuck open (non-conducting) and stuck closed (conducting) faults. If the arrangement is more likely to suffer from stuck open faults, the connection 19 is made since it gives another path through the arrangement. On the other hand, the connection 19 is not made if the arrangement is more likely to suffer from stuck closed faults. It does not matter whether or not the connection 19 is made if either type of fault is equally likely.

Although this technique is very robust, with only a modest area required for thin film MOS implementation, a circuit arrangement constructed with this type of logic will be slower and will exhibit a higher power consumption than its non-redundant counterpart.

SUMMARY OF THE INVENTION

According to the present invention, there is provided a fault tolerant circuit arrangement having quadruple redundancy. The circuit arrangement includes: an input and an output; four replicated circuit elements, including first and second circuit elements connected in series between the input and the output and third and fourth circuit elements connected in series between the input and the output such that the series combination of the first and second circuit elements is connected in parallel with the series combination of the third and fourth circuit elements between the input and the output; and, a control element connected between an interconnection point of the first and second circuit elements and an interconnection point of the third and fourth circuit elements. The control element is switchable by a control signal between a conducting mode, in which current flow is enabled between the interconnection points, and a non-conducting mode in which current flow is prevented between the interconnection points.

Such a circuit arrangement is particularly applicable to a thin film transistor (TFT) structure, and requires only modest area overhead compared to other forms of fault tolerant redundant circuitry. The arrangement offers a high degree of fault tolerance without requiring laser repair, and offers increased reliability over conventional quad masking circuits. Clearly, this renders the arrangement particularly suitable for the drive and control circuits of an active matrix device, such as an AMLCD.

Preferably, the circuit elements and/or the control element are switching elements, e.g., MOSFETs.

All the elements may be part of a thin film transistor (TFT) structure, e.g., an amorphous silicon thin film transistor structure or a polysilicon thin film transistor structure.

Specifically, each of the first, second, third, and fourth circuit elements and the control element may have a single thin film transistor structure, which may be an amorphous silicon thin film transistor structure or a polysilicon thin film transistor structure.

Alternatively, the first, second, third, and fourth circuit elements and the control elements may be integrated with one another to form a compound transistor structure, which may be amorphous silicon transistor structure or a polysilicon transistor structure. In such a case, the compound transistor structure may include a gate electrode which is common to all the circuit elements, a source electrode, and a drain electrode.

The fault tolerant circuit arrangement of the present invention may form control circuitry of an active matrix device.

According to another aspect of the present invention, an active matrix device incorporating a fault tolerant circuit arrangement as described above can be provided. The active matrix device may be a display device having a display substrate with the fault tolerant circuit arrangement included in a drive circuit fabricated on the display substrate. The active matrix device may be an active matrix liquid crystal display device.

Thus, the invention described herein makes possible the advantages of (1) providing a fault tolerant circuit arrangement which is very robust and tolerant to faults and which finds particular application in integrated circuits where the number of transistors is large and fault tolerance is critical, such as in the drive and control circuits of AMLCDs, and (2) providing an active matrix device incorporating the above-mentioned fault tolerant circuit arrangement.

These and other advantages of the present invention will become apparent to those skilled in the art upon reading and understanding the following detailed description with reference to the accompanying figures.

BRIEF DESCRIPTION OF THE DRAWINGS

In order that the invention may be more fully understood, reference will now be made, by way of example, to the accompanying drawings, in which.

DESCRIPTION OF THE PREFERRED EMBODIMENTS

Figure 4:
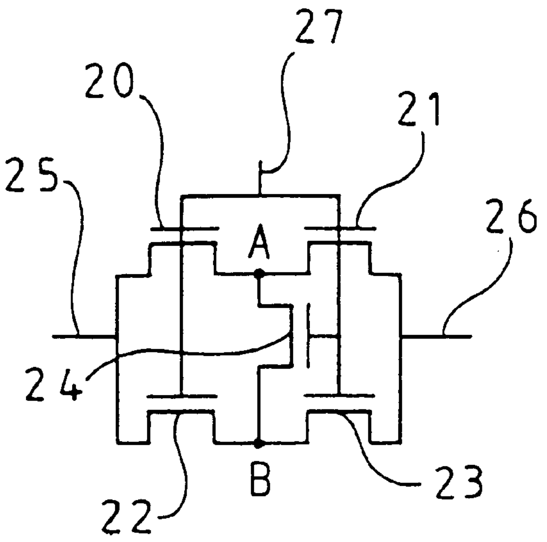
FIG. 4 shows an exemplary implementation of a QM circuit in accordance with the present invention.

FIG. 4 shows a preferred QM serial/parallel arrangement (i.e., a fault tolerant circuit arrangement) in accordance with the present invention. The arrangement includes four replicated circuit elements 20, 21, 22 and 23 in the form of, e.g., MOSFETs, connected together between an input 25 and an output 26.

Specifically, the first and second circuit elements 20 and 21 are connected in series between the input 25 and the output 26. Similarly, the third and fourth circuit elements 22 and 23 are connected in series between the input 25 and the output 26. Furthermore, the series combination of the first and second circuit elements 20 and 21 is connected in parallel with the series combination of the third and fourth circuit elements 22 and 23 between the input 25 and the output 26.

A control element 24 in the form of, e.g., a MOSFET, is connected between an interconnection point A of the first and second circuit elements 20 and 21 and an interconnection point B of the third and fourth circuit elements 22 and 23. The control element 24 is configured to be switchable, by a control signal applied to a control input 27, between a conducting mode in which current flow is enabled between the interconnection points A and B, and a non-conducting mode in which current flow is prevented between the interconnection points A and B.

It will be appreciated that the control input 27 is connected to the gate of each of the five elements 20–24 so that the control signal applied to the control input 27 concurrently controls the conduction of the source-drain path of each of the elements 20–24.

When the control signal is low, there is effectively no current path between the interconnection points A and B since the control element 24 is rendered non-conducting. Such a non-conducting mode is desirable to increase robustness against stuck closed faults in one or more of the circuit elements 20, 21, 22 and 23. Conversely, when the control signal is high, there is more chance of there being a current path between the interconnection points A and B since the control element 24 will normally be rendered conducting. This is desirable for increased robustness against stuck open faults in the circuit elements 20, 21, 22 and 23.

Clearly, the control element 24 may itself suffer a stuck open or stuck closed fault. This can result in such a situation that conduction may take place through the control element 24 when the element 24 would normally be expected to be in the non-conducting mode. Conversely, conduction may not take place through the control element 24 when the element 24 would normally be expected to be in the conducting mode.

Next, probabilities of fault occurrence in the fault tolerant circuit arrangement will be described below.

In general, if each transistor included in a fault tolerant circuit arrangement is considered as a simple digital switch under the control of the gate, each transistor (designated M) can be considered as either defect-free (i.e., no-faults indicated as "OK"), or as permanently non-conducting (that is stuck open "SO") or permanently conducting (that is stuck closed "SC"). The relative probabilities of each condition in a single transistor M can be considered as follows:

The probability of a stuck-open fault; $P(M_{SO})=p$

The probability of a stuck-closed fault; $P(M_{SC})=q$

The probability of defect-free (i.e., working correctly with no faults); $P(M_{OK})=1-p-q$ For the conventional QM circuit arrangement of FIG. 3 with the connection 19 not made, it is possible to determine the probabilities of stuck-open $P(MPS_{SO})$, stuck-closed $P(MPS_{SC})$, and no faults $P(MPS_{OK})$ to be respectively:

$$P(MPS_{SO})=4p^2$$

$$P(MPS_{SC})=2q^2$$

$$P(MPS_{OK})=1-(4p^2+2q^2)$$

where MPS denotes the parallel connected series-compound transistor arrangement.

Figure 1:
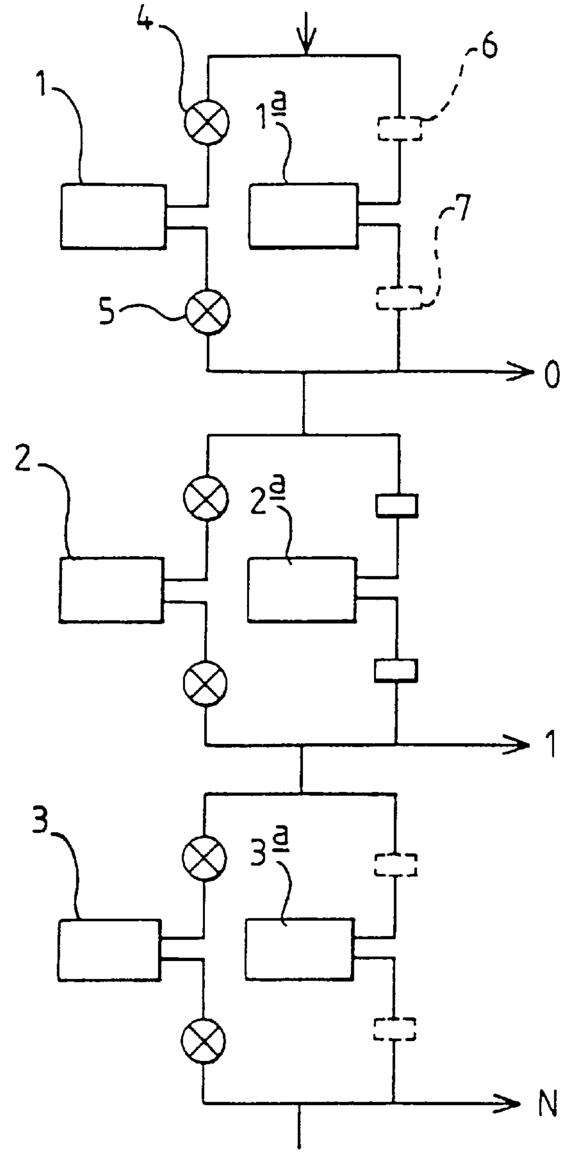
FIG. 1 is a diagram of a conventional RWR circuit arrangement for an AMLCD control circuit.
Figure 2:
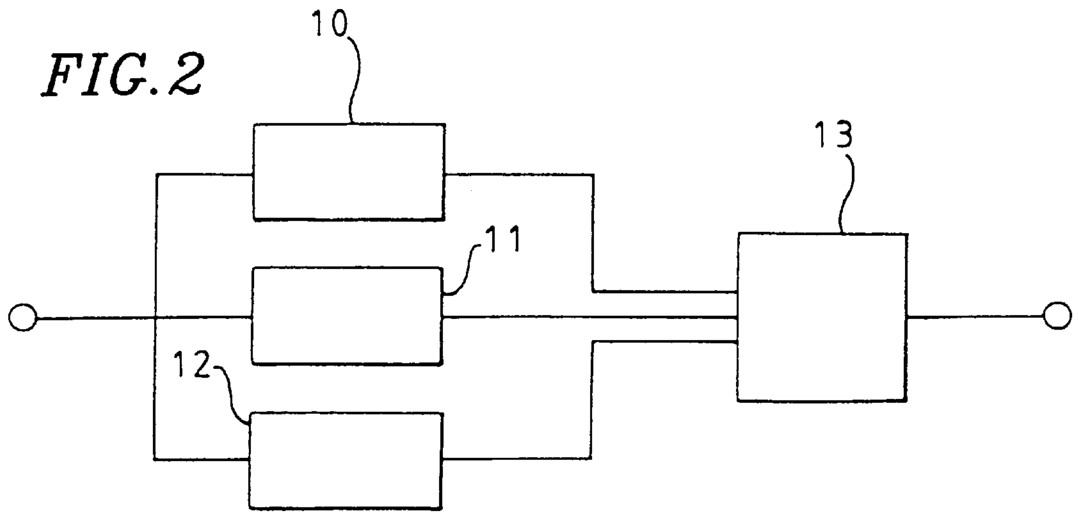
FIG. 2 is a diagram of a conventional TMR circuit arrangement.
Figure 3:
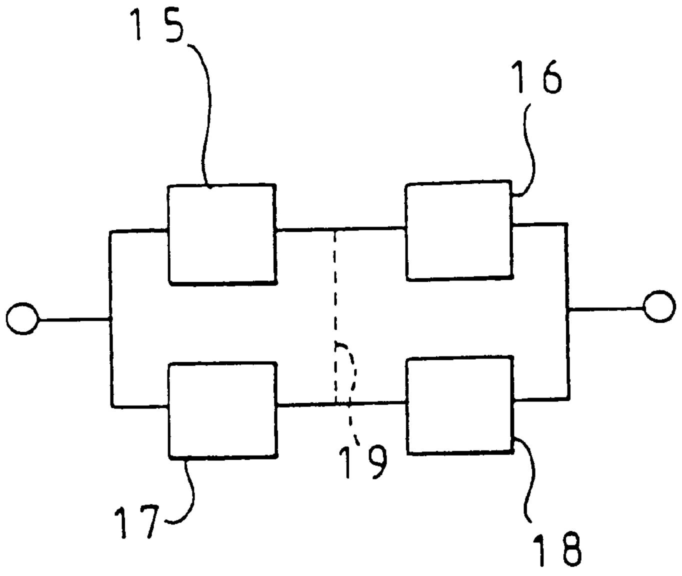
FIG. 3 is a diagram of a conventional QM circuit arrangement.

Similarly, for the conventional QM circuit arrangement of FIG. 3 with the connection 19 made, the corresponding probabilities of stuck-open $P(MSP_{SO})$, stuck-closed $P(MSP_{SC})$, and no faults $P(MSP_{OK})$ can be calculated to be given by:

$$P(MSP_{SO})=2p^2$$

$$P(MSP_{SC})=4q^2$$

$$P(MSP_{OK})=1-(2p^2+4q^2)$$

where MSP denotes the series connected parallel-compound transistor arrangement.

For comparison, the corresponding probabilities of stuck-open $P(MN_{SO})$, stuck-closed $P(MN_{SC})$, and no faults $P(MN_{OK})$ for the QM circuit arrangement in accordance with the present invention as shown in FIG. 4 incorporating five transistors 20–24 can be calculated to be as follows:

$$P(MN_{SO})=2p^2$$

$$P(MN_{SC})=2q^2$$

$$P(MN_{OK})=1-(2p^2+2q^2)$$

where MN denotes the novel compound transistor arrangement.

The above-mentioned probability $P(MN_{OK})$, which indicates that such a circuit arrangement is fault free, can be shown to be always greater than the corresponding probabilities $P(MPS_{OK})$ and $P(MSP_{OK})$ for the conventional QM circuit arrangements for all p and q.

It will therefore be appreciated that the provision of the control element 24 in the QM circuit arrangement of FIG. 4 in accordance with the present invention increases the fault tolerance of the arrangement, as compared with the conventional QM circuit arrangements. This is because it increases the number of combinations of failures of elements which may be tolerated without the arrangement as a whole failing. In particular, it increases the tolerance of the arrangement to failures of two or more elements in the stuck open or closed states.

A particular advantage of the QM circuit arrangement of FIG. 4 is that it can be fabricated as a transistor, and even in a compound transistor, in a generally similar manner to a thin film transistor (TFT) structure.

Figure 5A:
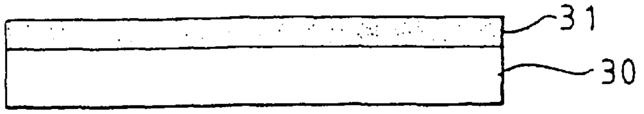
FIGS. 5A to 5E diagrammatically illustrate exemplary respective fabrication steps for producing the QM circuit in accordance with the present invention shown in FIG. 4.
Figure 5B:
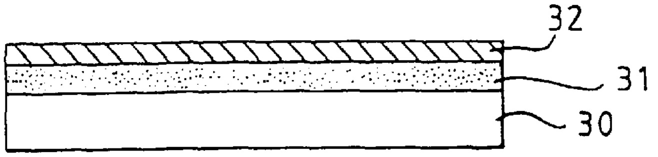
Figure 5C:
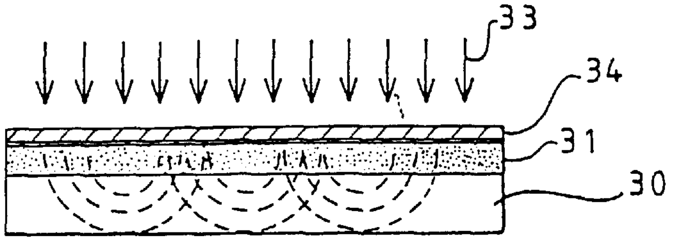
Figure 5D:
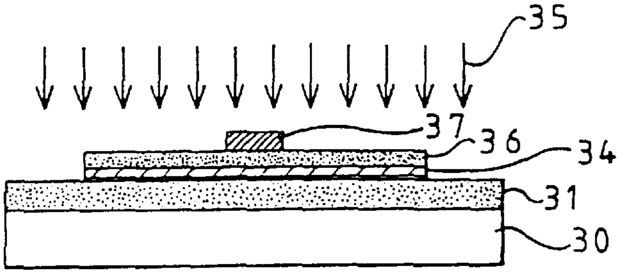
Figure 5E:
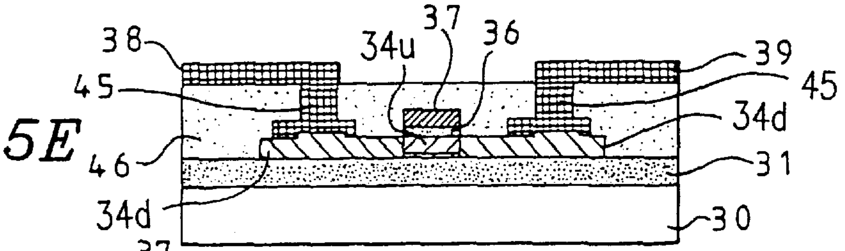
Figure 5F:
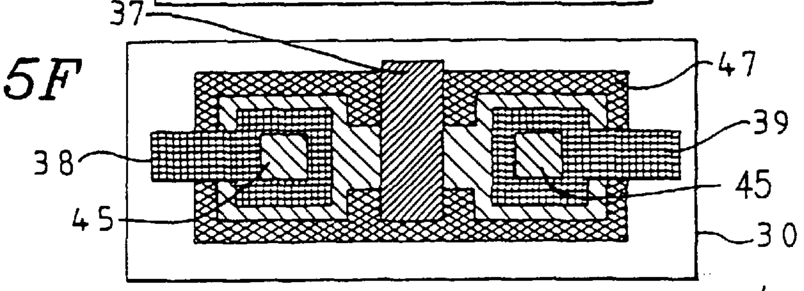
FIG. 5F diagrammatically illustrates a plan view of an exemplary single thin film transistor (TFT) structure to be used for realizing the QM circuit in accordance with the present invention shown in FIG. 4.

FIGS. 5A to 5E show exemplary successive steps in the fabrication of a single TFT structure (a plan view of which is illustrated in FIG. 5F) to be used for realizing the respective element in the circuit arrangement shown in FIG. 4. Although the TFT structure is formed on a glass substrate 30 utilizing polysilicon in the following description, it will be understood that such a TFT structure may alternatively be fabricated from amorphous silicon.

Firstly, a layer 31 of silicon dioxide ($SiO_2$) as shown in FIG. 5A is deposited on the glass substrate 30 in a known manner, for example by plasma enhanced chemical vapor deposition (PECVD). This layer 31 protects the transistors to be fabricated from impurities in the glass substrate 30.

A layer 32 of amorphous silicon is then deposited on top of the layer 31 of silicon dioxide, as shown in FIG. 5B. In a subsequent step as shown in FIG. 5C, the amorphous silicon layer 32 is annealed by excimer laser radiation 33 to produce a polysilicon layer 34, while the substrate 30 remains at a temperature of less than 600° C.

The polysilicon layer 34 is then etched in a known manner, for example by $CF_4$ plasma etching, to produce a polysilicon island constituting the transistor body. A layer 36 of silicon dioxide ($SiO_2$) is then deposited on the polysilicon island to form the gate insulator 36 (the gate oxide layer 36), as shown in FIG. 5D.

The gate electrode 37 is then formed by sputtering an aluminum layer onto the gate oxide layer 36 in a prescribed pattern. The gate oxide layer 36 is then patterned by etching with using the gate electrode 37 as a mask (see FIG. 5D). The polysilicon layer 34 remains unetched in this etching process.

An ion implantation step is then performed using n-type or p-type dopants 35 into the polysilicon layer 34 so as to dope those areas defined by a mask 47 (shown in a plan view in FIG. 5F) and the gate electrode 37. In this doping process, regions 34*d* of the polysilicon layer 34 (to become source/drain regions 34*d* in the resultant transistor) are doped with the dopants 35, while the region 34*u* beneath the gate electrode 37 (to be a channel region 34*u* of the resultant transistor) remains undoped. The doped dopants 35 are subsequently activated by excimer laser annealing to form the source/drain regions 34*d* of the transistor.

An insulator layer 46 of silicon dioxide is then deposited over the entire transistor, and contact holes 45 are opened for connecting aluminum source and drain electrodes 38 and 39 to the source/drain regions 34*d*, as shown in FIGS. 5E and 5F.

The respective elements 20–24 in the circuit arrangement of FIG. 4 can be implemented as an independent single TFT structure as illustrated in FIG. 5F. In other words, the circuit arrangement of FIG. 4 can be configured using five of the single TFT structures. Alternatively, the elements 20–24 in the circuit arrangement of FIG. 4 can be integrated into a single compound TFT structure, e.g., as illustrated in FIG. 5G.

Figure 5G:
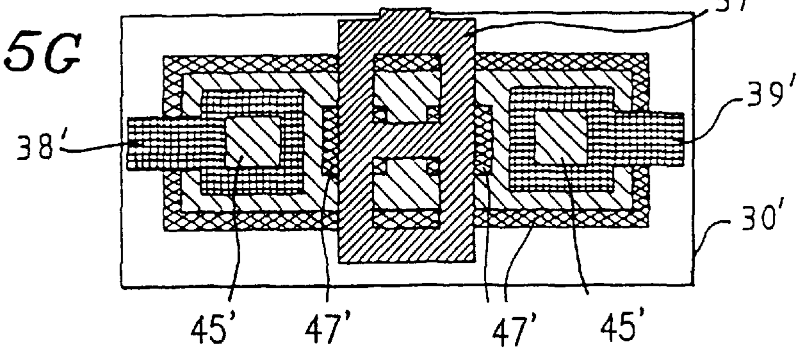
FIG. 5G diagrammatically illustrates a plan view of an exemplary integrated quadruple logic TFT structure incorporating the QM circuit in accordance with the present invention shown in FIG. 4.

FIG. 5G is a plan view of an integrated quadruple logic TFT structure incorporating the circuit arrangement of FIG. 4 in accordance with the present invention. The structure of FIG. 5G is formed by a similar series of fabrication steps to the above described steps for producing a single TFT structure of FIG. 5F. Like parts in FIG. 5G are denoted by the same reference numerals in FIG. 5F but with primes.

In this case, the five MOSFETs are formed by the overlapping gate and drain diffusions with common input, output and control connections being made to the source, drain and gate electrodes 38', 39' and 37'.

Such a compound TFT structure of FIG. 5G requires an area of approximately 2.5 times the area required for a single TFT structure of FIG. 5F. When considering a total occupied area, a significant reduction in the total occupied area can be achieved by employing the compound TFT structure as in FIG. 5G to configure the circuit arrangement of FIG. 4, as compared with the case where five of the single TFT structures of FIG. 5F are combined.

This relatively modest area overhead is a consequence of the fact that the TFT size is dominated by the large contact areas which are essential for accurate alignment of what is typically a large substrate. Since a large area is not required to implement the compound TFT structure, such a structure is applicable to the peripheral drive and control circuits of AMLCDs. Such structure is also applicable, in a modified form using lightly doped drain diffusion, at the pixels of AMLCDs where robustness and small size are desirable.

Figure 6:
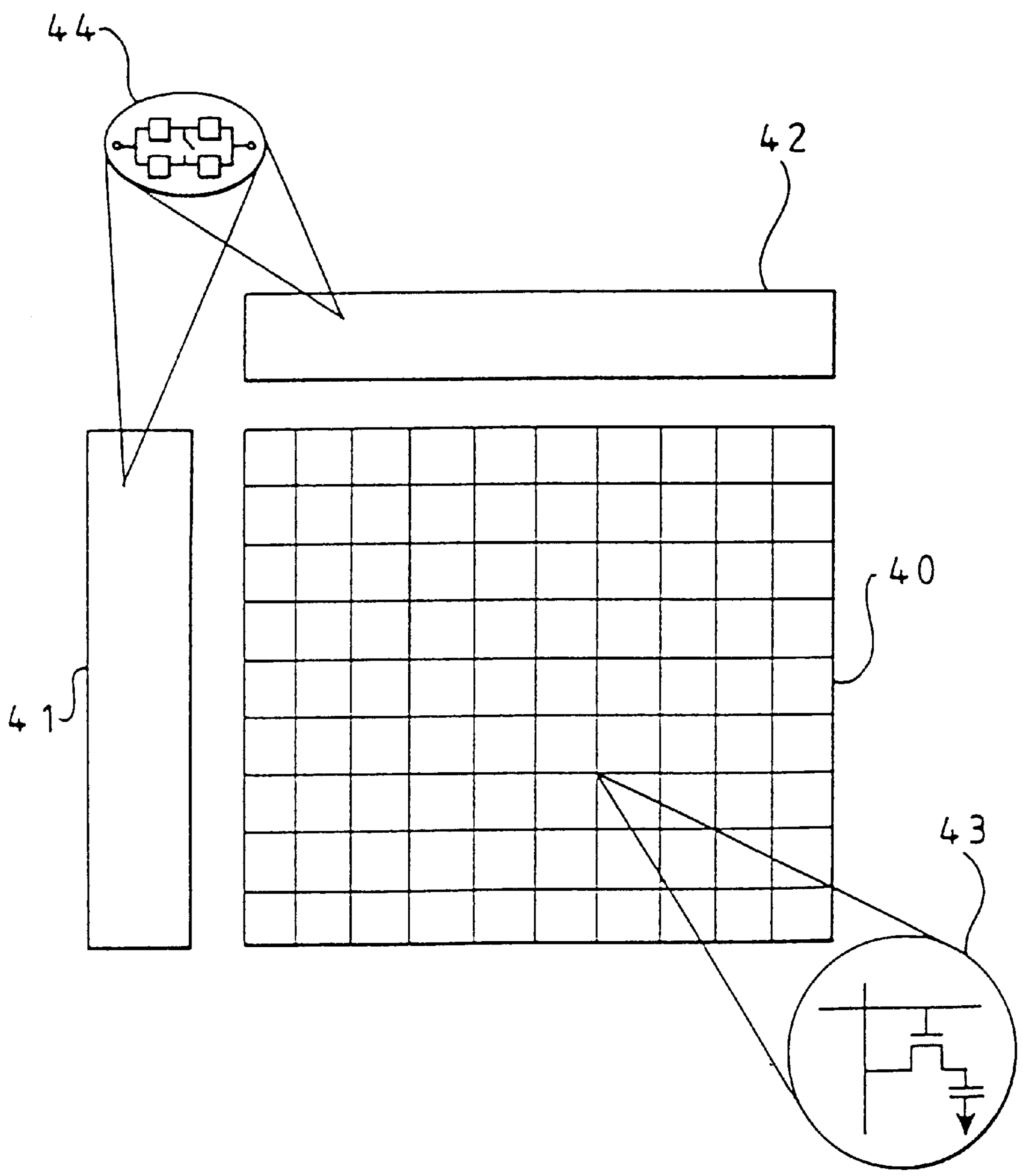
FIG. 6 diagrammatically shows use of such a QM circuit in accordance with the present invention in an AMLCD with integrated peripheral circuits.

FIG. 6 diagrammatically shows the application of such a QM circuit arrangement to an AMLCD.

The AMLCD of FIG. 6 includes an active matrix 40 with integrated scan and data driver circuits 41 and 42 in the form of shift registers at the periphery of the display for providing sample signals to each row of the matrix 40, and timing signals for serial to parallel conversion of the video data. The detail diagram 43 shows a typical active circuit for each pixel of the matrix 40.

Furthermore, the detail diagram 44 shows the application of the QM circuit arrangement of the present invention as shown in FIG. 4 to the key elements of the peripheral scan and data driver circuits 41 and 42 in order to provide the required fault tolerance. The QM circuit arrangement 44 of such elements not only provides considerable robustness in use, but also increases the chances of obtaining a working display when fabricating such an AMLCD incorporating integrated control circuitry.

It should be noted that the fault tolerant circuit arrangement of the present invention can operate both when receiving an analog input signal and when a receiving a digital input signal.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A fault tolerant circuit arrangement, comprising:

an input;

an output;

a first circuit element, a second circuit element, a third circuit element, and a fourth circuit element, provided in such a manner that the first and second circuit elements are connected in series between the input and the output to form a first series combination, and the third and fourth circuit elements are connected in series between the input and the output to form a second series combination, the first series combination being connected in parallel with the second series combination between the input and the output; and a control element connected between an interconnection point of the first and second circuit elements and an interconnection point of the third and fourth circuit elements, wherein the first circuit element, the second circuit element, the third circuit element, the fourth circuit element and the control element are connected to a common control input, and the control element being switchable by a control signal between a conducting mode in which current flow is enabled between the interconnection points and a non-conducting mode in which current flow is prevented between the interconnection points.

2. A fault tolerant circuit arrangement according to claim 1, wherein each of the first, second, third, and fourth circuit elements is a switching element.

3. A fault tolerant circuit arrangement according to claim 2, wherein each of the first, second, third, and fourth circuit elements is a MOSFET.

4. A fault tolerant circuit arrangement according to claim 1, wherein the control element is a switching element.

5. A fault tolerant circuit arrangement according to claim 4, wherein the control element is a MOSFET.

6. A fault tolerant circuit arrangement according to claim 1, wherein each of the first, second, third, and fourth circuit elements and the control element has a single thin film transistor structure.

7. A fault tolerant circuit arrangement according to claim 6, wherein each of the thin film transistor structures is an amorphous silicon thin film transistor structure or a polysilicon thin film transistor structure.

8. A fault tolerant circuit arrangement according to claim 1, wherein the first, second, third, and fourth circuit elements and the control element are integrated with one another to form a compound transistor structure.

9. A fault tolerant circuit arrangement according to claim 8, wherein the compound transistor structure is an amorphous silicon transistor structure or a polysilicon transistor structure.

10. A fault tolerant circuit arrangement according to claim 8, wherein the compound transistor structure includes: a gate electrode which is common to all of the first, second, third, fourth circuit elements and the control element; a source electrode; and, a drain electrode.

11. A fault tolerant circuit arrangement according to claim 1, forming control circuitry of an active matrix device.

12. An active matrix device incorporating a fault tolerant circuit arrangement, the fault tolerant circuit arrangement comprising:

an input;

an output;

a first circuit element, a second circuit element, a third circuit element, and a fourth circuit element, provided in such a manner that the first and second circuit elements are connected in series between the input and the output to form a first series combination, and the third and fourth circuit elements are connected in series between the input and the output to form a second series combination, the first series combination being connected in parallel with the second series combination between the input and the output; and a control element connected between an interconnection point of the first and second circuit elements and an interconnection point of the third and fourth circuit elements, wherein the first circuit element, the second circuit element, the third circuit element, the fourth circuit element and the control element are connected to a common control input, and the control element being switchable by a control signal between a conducting mode in which current flow is enabled between the interconnection points and a non-conducting mode in which current flow is prevented between the interconnection points.

13. An active matrix device according to claim 12, which is a display device having a display substrate, wherein the fault tolerant circuit arrangement is included in a drive circuit fabricated on the display substrate.

14. An active matrix device according to claim 12, which is an active matrix liquid crystal display device.

* * * * *